United States Patent
Kinosz et al.

(10) Patent No.: US 6,585,797 B2
(45) Date of Patent: Jul. 1, 2003

(54) RECIRCULATING MOLTEN METAL SUPPLY SYSTEM AND METHOD

(75) Inventors: Michael J. Kinosz, Apollo, PA (US); Thomas N. Meyer, Murrysville, PA (US)

(73) Assignee: Alcoa Inc., Pittsburgh, PA (US)

(*) Notice: Subject to any disclaimer, the term of this patent is extended or adjusted under 35 U.S.C. 154(b) by 0 days.

(21) Appl. No.: 10/056,421

(22) Filed: Jan. 24, 2002

(65) Prior Publication Data

US 2002/0125620 A1 Sep. 12, 2002

Related U.S. Application Data

(60) Provisional application No. 60/264,206, filed on Jan. 25, 2001.

(51) Int. Cl.⁷ ................................................. C22B 2/06
(52) U.S. Cl. ..................... 75/408; 75/412; 75/414; 75/681; 164/134; 164/306; 164/337; 266/214; 266/242
(58) Field of Search ................. 266/242, 214; 75/681, 414, 408, 412; 164/134, 306, 337

(56) References Cited

U.S. PATENT DOCUMENTS

| | | | |
|---|---|---|---|
| 2,579,634 A | 12/1951 | Warren | 266/33 |
| 2,648,715 A | 8/1953 | Lillienberg | 13/29 |
| 2,945,325 A | 7/1960 | Deible et al. | 49/54 |
| 3,061,298 A | 10/1962 | Yamazoe | 266/34 |
| 3,249,675 A | 5/1966 | Matchen | 13/25 |
| 3,293,412 A | 12/1966 | Profitt et al. | 219/421 |
| 3,688,007 A | 8/1972 | McKenna et al. | 13/20 |
| 3,809,379 A | 5/1974 | Carbonnel et al. | 266/34 V |
| 3,935,003 A | 1/1976 | Steinke et al. | 75/68 R |
| 3,991,263 A | 11/1976 | Folgero et al. | 13/26 |
| 4,169,584 A | * 10/1979 | Mangalick | 266/214 |
| 4,230,308 A | 10/1980 | Gueguen | 266/92 |
| 4,263,470 A | 4/1981 | Sjoberg | 13/25 |
| 4,299,268 A | 11/1981 | Lavanchy et al. | 164/155 |
| 4,390,364 A | 6/1983 | Yu | 75/67 A |
| 4,590,988 A | 5/1986 | Fukuoka et al. | 164/463 |
| 4,685,657 A | 8/1987 | Okubo et al. | 266/234 |
| 4,753,283 A | 6/1988 | Nakano | 164/312 |
| 4,844,425 A | 7/1989 | Piras et al. | 266/215 |
| 4,892,294 A | 1/1990 | Kagstrom | 266/233 |
| 4,967,827 A | 11/1990 | Campbell | 164/134 |
| 5,020,778 A | 6/1991 | Thibault et al. | 266/89 |
| 5,188,795 A | 2/1993 | Matsuoka | 266/202 |
| 5,395,094 A | 3/1995 | Areaux | 266/233 |
| 5,398,750 A | 3/1995 | Crepeau et al. | 164/154.2 |
| 5,411,240 A | 5/1995 | Rapp et al. | 266/94 |
| 5,459,748 A | 10/1995 | Gleichman et al. | 373/132 |
| 5,567,378 A | 10/1996 | Mochizuki et al. | 266/44 |
| 5,718,416 A | 2/1998 | Flisakowski et al. | 266/217 |
| 5,735,935 A | 4/1998 | Areaux | 75/571 |
| 5,908,488 A | 6/1999 | Schroder et al. | 75/386 |
| 6,066,289 A | 5/2000 | Eckert | 266/235 |
| 6,136,264 A | 10/2000 | Wigchert | 266/235 |
| 6,450,237 B1 | * 9/2002 | Meyer et al. | 164/135 |

FOREIGN PATENT DOCUMENTS

JP      6-246432      3/1993

* cited by examiner

*Primary Examiner*—Melvyn Andrews
(74) *Attorney, Agent, or Firm*—Christian E. Schuster; Gary P. Topolosky

(57) ABSTRACT

The melter furnace includes a heating chamber (16), a pump chamber (18), a degassing chamber (20), and a filter chamber (22). The pump chamber (18) is located adjacent the heating chamber (16) and houses a molten metal pump (30). The degassing chamber (20) is located adjacent and in fluid communication with the pump chamber (18), and houses a degassing mechanism (36). The filter chamber (22) is located adjacent and in fluid communication with the degassing chamber (20). The filter chamber (22) includes a molten metal filter (38). The melter furnace (12) is used to supply molten metal to an externally located holder furnace (14), which then recirculates molten metal back to the melter furnace (12).

20 Claims, 6 Drawing Sheets

RECIRCULATING MOLTEN METAL SUPPLY SYSTEM AND METHOD

CROSS-REFERENCE TO RELATED APPLICATION

This application claims the benefit of earlier filed U.S. Provisional Patent Application Serial No. 64/264,206, filed Jan. 25, 2001, entitled "Recirculating Molten Metal Supply System and Method."

STATEMENT REGARDING FEDERALLY FUNDED RESEARCH

The subject matter of this application was made with United States Government support under Contract No. 86X-SU545C awarded by the Department of Energy. The United States Government has certain rights to this invention.

BACKGROUND OF THE INVENTION

1. Field of the Invention

The present invention relates to a recirculating molten metal supply system and, more particularly, to a molten metal supply system in which molten metal is continuously circulated between a melting furnace and a holding furnace for providing a clean and uniform temperature molten metal supply to a casting machine, a molten metal degassing furnace, a molten metal filtration system, and the like.

2. Description of the Prior Art

A typical casting apparatus for casting metal component parts includes a supply tank configured to contain molten metal. The supply tank is typically in fluid communication with an injection device for injecting the molten metal into a casting machine located outside the supply tank. The supply tank may be a molten metal holding furnace that contains the molten metal. The supply tank, or holding furnace, is typically heated to maintain a substantially constant, preset molten metal temperature in the holding furnace. Numerous methods are known in the art for heating molten metal in a holding furnace. Several common examples include induction heating, radiant heating, and immersion heating.

The holding furnace is often supplied with molten metal from a larger furnace. Once a supply or "batch" of molten metal is received in the holding furnace, the holding furnace through its internal or external heating devices attempts to maintain the molten metal substantially at a preset temperature. The holding furnace then supplies the molten metal to, for example, an injection device for injecting the molten metal into a casting machine.

As the supply of molten metal in the holding furnace decreases, it becomes progressively more difficult to maintain a set molten metal temperature in the holding furnace. U.S. Pat. No. 4,753,283 to Nakano discloses a typical example of the foregoing. This reference discloses a horizontal injection casting machine in which molten metal is maintained in a heat retaining furnace, or holding furnace, which periodically provides molten metal to the casting machine. Over time, the amount of molten metal in the heat retaining furnace steadily decreases making it progressively more difficult to maintain a set molten metal temperature in the heat retaining furnace. Further, the heat retaining furnace must be periodically supplied or refilled with a new "batch" of molten metal from a smelting furnace.

As stated hereinabove, a disadvantage with "batch" type holding furnace arrangements is that as the supply of molten metal in the holding furnace decreases, it becomes progressively more difficult to maintain the temperature of the molten metal. An additional disadvantage is that as the supply of molten metal in the holding furnace decreases, the impurity level in the remaining molten metal increases. As a result, the quality of the metal component parts decreases with each injection cycle of molten metal into the casting machine. Further, in order to supply the holding furnace with a new "batch" of molten metal, the cover of the holding furnace must typically be removed, which is a time consuming process.

One known solution to the foregoing disadvantages is to arrange the holding furnace and a larger smelting or "supply" furnace as a single, two-chamber furnace. Such two-chamber "melt" furnaces may be used in combination with a casting machine. Such two-chamber melt furnaces typically include a heating chamber in which the molten metal is heated, and a removal chamber which stores the molten metal prior to delivering the molten metal to a casting machine. An intermediate chamber may be located between the heating chamber and the removal chamber, which is used to maintain a fixed level of molten metal in the removal chamber by continuously circulating molten metal from the heating chamber to the removal chamber.

A two-chamber melt furnace similar to that discussed hereinabove is disclosed by U.S. Pat. No. 5,411,240 to Rapp et al. The two-chamber melt furnace disclosed by the Rapp et al. patent includes a pump located in an intermediate storage chamber that continuously delivers heated molten metal from a heating chamber to a removal chamber. The pump is also used to recirculate molten metal from the removal chamber back to the heating chamber. The Rapp et al. patent utilizes an overflow pipe in the intermediate chamber to control the molten metal level in the removal chamber.

In view of the foregoing, an object of the present invention is to provide a recirculating molten metal supply system in which a uniform molten metal temperature may be maintained throughout the system. In addition, it is an object of the present invention to provide a recirculating molten metal supply system in which a clean supply of molten metal is continuously supplied to a casting machine for improving the quality of cast metal components formed in the casting machine. It is a further object of the present invention to provide a method of molten metal injection to a casting machine that improves the quality of cast metal components formed in the casting machine.

SUMMARY OF THE INVENTION

The above objects are accomplished with a molten metal supply system for supplying molten metal to a casting machine in accordance with the present invention. The molten metal supply system includes a holder furnace, a casting mold, at least one molten metal injector, and a melter furnace. The holder furnace defines a molten metal receiving chamber. The casting mold is located above the holder furnace and defines a mold cavity for casting metal components. The injector is supported from a bottom side of the casting mold and extends downward into the molten metal receiving chamber. The injector provides fluid communication between the molten metal receiving chamber and the mold cavity. The injector is configured to inject molten metal received into the molten metal receiving chamber into the mold cavity.

The melter furnace is located externally adjacent to the holder furnace and is in fluid communication with the holder furnace through a pair of conduits. The conduits include a first conduit for supplying molten metal to the molten metal receiving chamber, and a second conduit for recirculating molten metal from the molten metal receiving chamber to the melter furnace. The melter furnace further includes a heating chamber, a pump chamber, a degassing chamber, and a filter chamber.

The heating chamber is in fluid communication with the molten metal receiving chamber through the second conduit and receives molten metal recirculating back through the second conduit from the holder furnace. The pump chamber is located adjacent the heating chamber and houses a molten metal pump. The pump has an inlet in fluid communication with the heating chamber and has an outlet. The pump is configured to circulate molten metal through the molten metal supply system during its operation. The degassing chamber is located adjacent the pump chamber and houses a degassing mechanism. The outlet of the pump is in fluid communication with the degassing chamber and provides molten metal to the degassing chamber during operation of the molten metal supply system. The filter chamber is located adjacent and in fluid communication with the degassing chamber. The filter chamber is in fluid communication with the molten metal receiving chamber through the first conduit for supplying degassed and filtered molten metal to the molten metal receiving chamber during operation of the molten metal supply system.

The molten metal receiving chamber may define a plurality of vertically extending chambers connected in series. A plurality of molten metal injectors may be supported from the bottom side of the casting mold. The injectors may cooperate, respectively, with the plurality of vertically extending chambers.

The heating chamber may include a burner device for heating the molten metal contained therein during operation of the molten metal supply system. The degassing mechanism may be a rotary degassing mechanism. The filter chamber may include a molten metal filter configured to filter particles larger than about 50–80 microns.

The present invention is also a method of supplying molten metal to a casting machine. The method may include the steps of: providing a casting machine comprising a casting mold defining a mold cavity for casting metal components, a holder furnace located beneath the casting mold for supplying molten metal to the mold cavity, and a melter furnace externally positioned adjacent the holder furnace for supplying molten metal to the holder furnace; filling the melter furnace with molten metal; placing the holder furnace in fluid communication with the casting mold; placing the melter furnace in fluid communication with the holder furnace through a first conduit for supplying molten metal to the holder furnace, and through a second conduit for recirculating molten metal from the holder furnace to the melter furnace, with the melter furnace further comprising a heating chamber, a pump chamber, and a degassing chamber; heating molten metal in the heating chamber; pumping molten metal from the heating chamber to the degassing chamber and the filter chamber with a pump; degassing the molten metal into the degassing chamber; filtering the molten metal in the filter chamber; supplying degassed and filtered molten metal to the holder furnace through the first conduit; and continuously recirculating molten metal from the holder furnace to the heating chamber through the second conduit.

The method may include the step of supporting a plurality of molten metal injectors from a bottom side of the casting mold, with the injectors configured to provide fluid communication between the holder furnace and the casting mold. The holder furnace may define a molten metal receiving chamber having a plurality of vertically extending chambers connected in series. The method may further include the step of receiving the molten metal injectors into the vertically extending chambers, respectively, with the injectors placing the vertically extending chambers in fluid communication with the mold cavity.

The method of the present invention may further include the steps of: passing molten metal to the vertically extending chambers through the first conduit; pumping molten metal through the vertically extending chambers to maintain a substantially constant level of molten metal in the vertically extending chambers; receiving molten metal into each of the injectors; and injecting molten metal into the mold cavity with the injectors at different times and at different rates to completely fill the mold cavity.

The degassing mechanism may be a rotary degassing mechanism, and the method may further include the step of supplying a mixture of about 0.1 to 10% chlorine with a balance of one of argon and nitrogen gas to the molten metal in the degassing chamber with the rotary degassing mechanism to degas the molten metal passing through the degassing chamber.

A molten metal level sensor may be located in the filter chamber, and the method may further include the steps of: monitoring the level of molten metal in the filter chamber with the level sensor; and sending a cutoff signal to the pump when the level of molten metal in the filter chamber reaches a predetermined level.

Finally, the method may include the step of internally circulating molten metal in the melter furnace through a bypass conduit connecting the filter chamber and the heating chamber.

Further details and advantages of the present invention will become apparent from the following detailed description read in conjunction with the drawings.

DETAILED DESCRIPTION OF THE PREFERRED EMBODIMENTS

Figure 1:
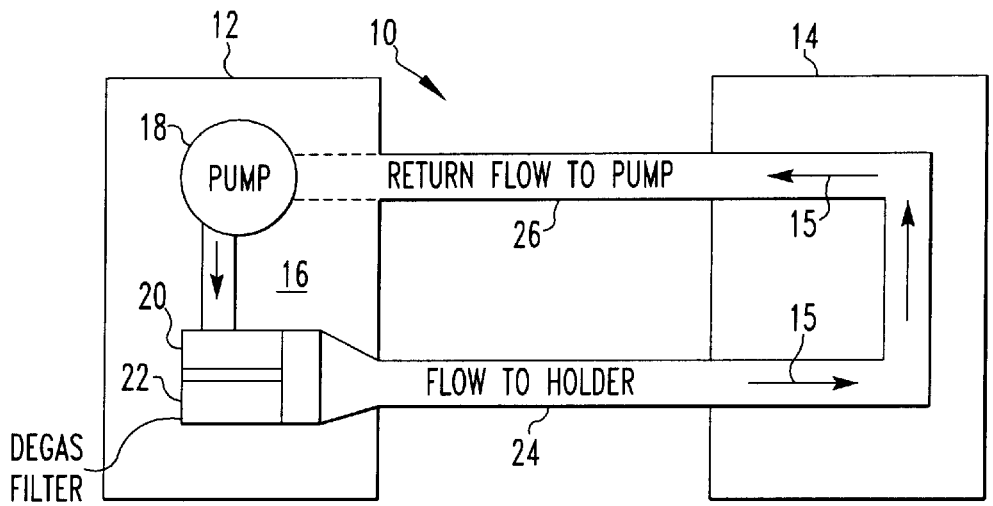
FIG. 1 is a schematic plan view of a recirculating molten metal supply system in accordance with the present invention.

Referring to FIG. 1, a molten metal supply system 10 in accordance with the present invention is shown schematically. The molten metal supply system 10 generally includes a main melter furnace 12 and a holder furnace 14. The melter furnace 12 is preferably much larger than the holder furnace 14 and may contain, for example, on the order of 30,000 pounds of molten metal for the system 10. The holder furnace 14 may contain, for example, about 2,000 pounds of molten metal. The melter furnace 12 generally provides a constant and steady supply of molten metal to the holder furnace 14. Arrows 15 in FIG. 1 identify the circulating flow of the molten metal through the melter furnace 12 and the holder furnace 14.

Figure 2:
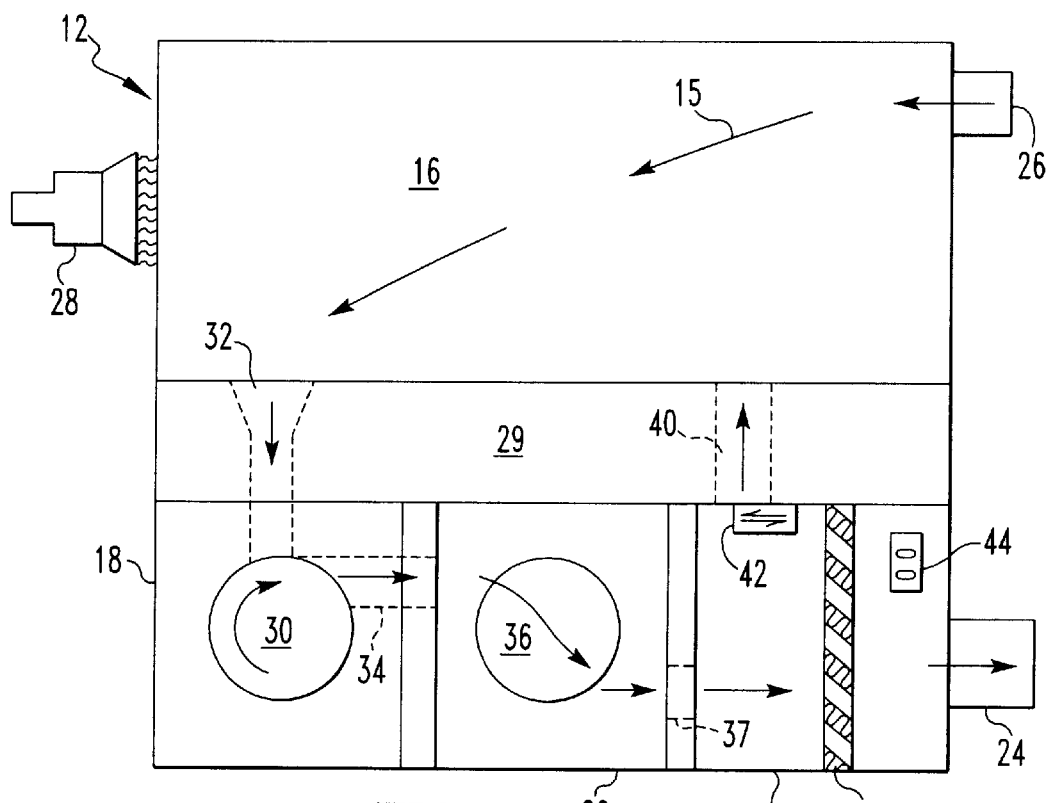
FIG. 2 is a schematic plan view of the molten metal supply system of FIG. 1 showing further details of the system.

Referring now to FIGS. 1 and 2, the melter furnace 12 includes a large heating chamber 16 for containing a supply of molten metal. As stated previously, the melter furnace 12 may contain on the order of 30,000 pounds of molten metal. The majority of this molten metal is preferably held within the heating chamber 16. The melter furnace 12 further includes a pump chamber 18 located adjacent the heating chamber 16 and in fluid communication therewith. A molten metal degassing chamber 20 is located adjacent the pump chamber 18 and in fluid communication therewith. Further, the melter furnace 12 includes a molten metal filter chamber 22 located adjacent the degassing chamber 20 and in fluid communication with both the degassing chamber 20 and the heating chamber 16. Thus, the melter furnace 12 is generally defined by the heating chamber 16, the pump chamber 18, the degassing chamber 20, and the filter chamber 22. The melter furnace 12 is in fluid communication with the holder furnace 14, through a first conduit 24 that supplies molten metal to the holder furnace 14 and through a second conduit 26 that returns molten metal from the holder furnace 14 to the melter furnace 12.

The heating chamber 16 is preferably heated by an external heating device, such as a burner 28, located adjacent a sidewall of the heating chamber 16. The burner 28 is provided to supply the heat energy required for melting metal within the heating chamber 16 and, further, the heat energy generally required to maintain a substantially constant molten metal temperature throughout the molten metal supply system 10. Sufficient heat energy is preferably transferred to the heating chamber 16 such that electrical energy input to heating elements, discussed hereinafter, of the holder furnace 14 is minimized. The heating chamber 16 is generally separated from the pump chamber 18, the degassing chamber 20, and the filter chamber 22 by a common wall 29.

The pump chamber 18 is located adjacent the heating chamber 16 and houses a molten metal pump 30 for circulating molten metal throughout the molten metal supply system 10 The pump 30 provides the necessary motive forces for moving molten metal throughout the molten metal supply system 10. The pump 30 preferably includes a ceramic impeller and ceramic housing and is preferably suitable for use with molten aluminum alloys. The pump 30 may be a mechanical, gas lift, or electro-mechanical pump.

An inlet 32 to the pump 30 is in fluid communication with the heating chamber 16 through the common wall 29. An outlet 34 of the pump is in fluid communication with the degassing chamber 20 through the wall separating these chambers. Thus, during operation of the pump 30 molten metal flows from the heating chamber 16 into the pump 30 through the pump inlet 32. The pump 30 then pumps molten metal into the degassing chamber 20 through the pump outlet 34.

The degassing chamber 20 houses a degassing mechanism 36, which is preferably used to reduce the hydrogen content of the molten metal when the molten metal is aluminum alloy, or another similar metal. The degassing mechanism 36 is preferably a rotary degassing mechanism. Suitable rotary degassing mechanisms for molten aluminum alloy applications include Alcoa Inc. Rotary Degasser Model Nos. R622 and R1022. The Alcoa Inc. R622 and R1022 devices are well known and standard in the art. The rotary degassing mechanism 36 may use a mixture of 0.1–10% chlorine with a balance of argon or nitrogen to reduce the hydrogen content of the molten aluminum alloy. From the degassing chamber 20, under the influence of the pump 30, molten metal flows to the filter chamber 22 through an opening 37 extending through the wall separating the degassing chamber 20 and the filter chamber 22. The degassing chamber 20 and filter chamber 22 are used in the molten metal supply system 10 when the molten metal contains, for example, hydrogen and/or inclusions (i.e. debris). To remove such impurities, the degassing chamber 20 and filter chamber 22 are provided as a means for "cleaning" the molten metal. Such cleaning techniques are typically necessary when the molten metal is a molten aluminum alloy, brass, copper, or other similar metals having a low melting point.

The filter chamber 22 includes a molten metal filter 38 for filtering the molten metal prior to passing the molten metal to the holder furnace 14 through the first conduit 24. The molten metal filter 38 may be, for example, a Metaullics, Inc. No. 6 grit filter, which removes particles larger than 50–80 microns. A bypass conduit 40 extending through the common wall 29 connects the filter chamber 22 to the heating chamber 16. The bypass conduit 40 preferably includes an adjustable bypass gate 42 for selectively allowing molten metal to flow from the filter chamber 22 to the heating chamber 16. The bypass conduit 40 and bypass gate 42 enable internal circulation within the melter furnace 12 to ensure uniform temperature throughout the entire molten metal supply system 10. The bypass conduit 40 may be used for internal circulation within the melter furnace 12 whether or not the pump 30 is supplying molten metal to the holder furnace 14. The adjustable bypass gate 42 may be remotely or manually operated.

The first and second conduits 24, 26 are preferably provided as heated troughs for maintaining the temperature of the molten metal flowing to and from the holder furnace 14. A mechanical or electrical high level shutdown sensor 44 is provided within the filter chamber 22 to sense the level of molten metal flowing from the filter chamber 22 into the first conduit 24 and prevent an overflow of the first conduit 24 should the holder furnace 14 become overfilled with molten metal. The sensor 44 may be configured to send a cut-off signal to the pump 30.

Figure 3:
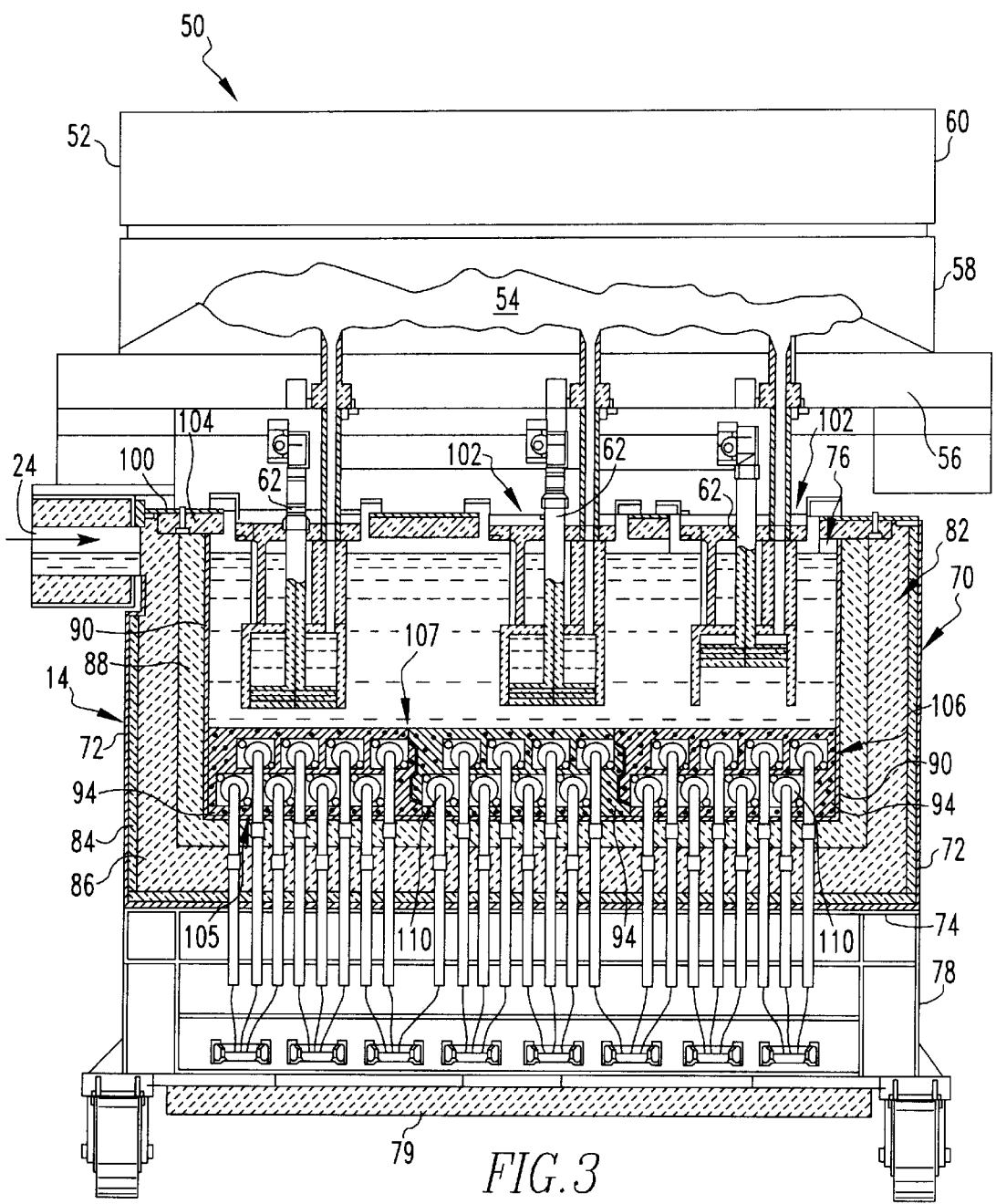
FIG. 3 is a cross-sectional view of a holder furnace used in the molten metal supply system of FIGS. 1 and 2.
Figure 4:
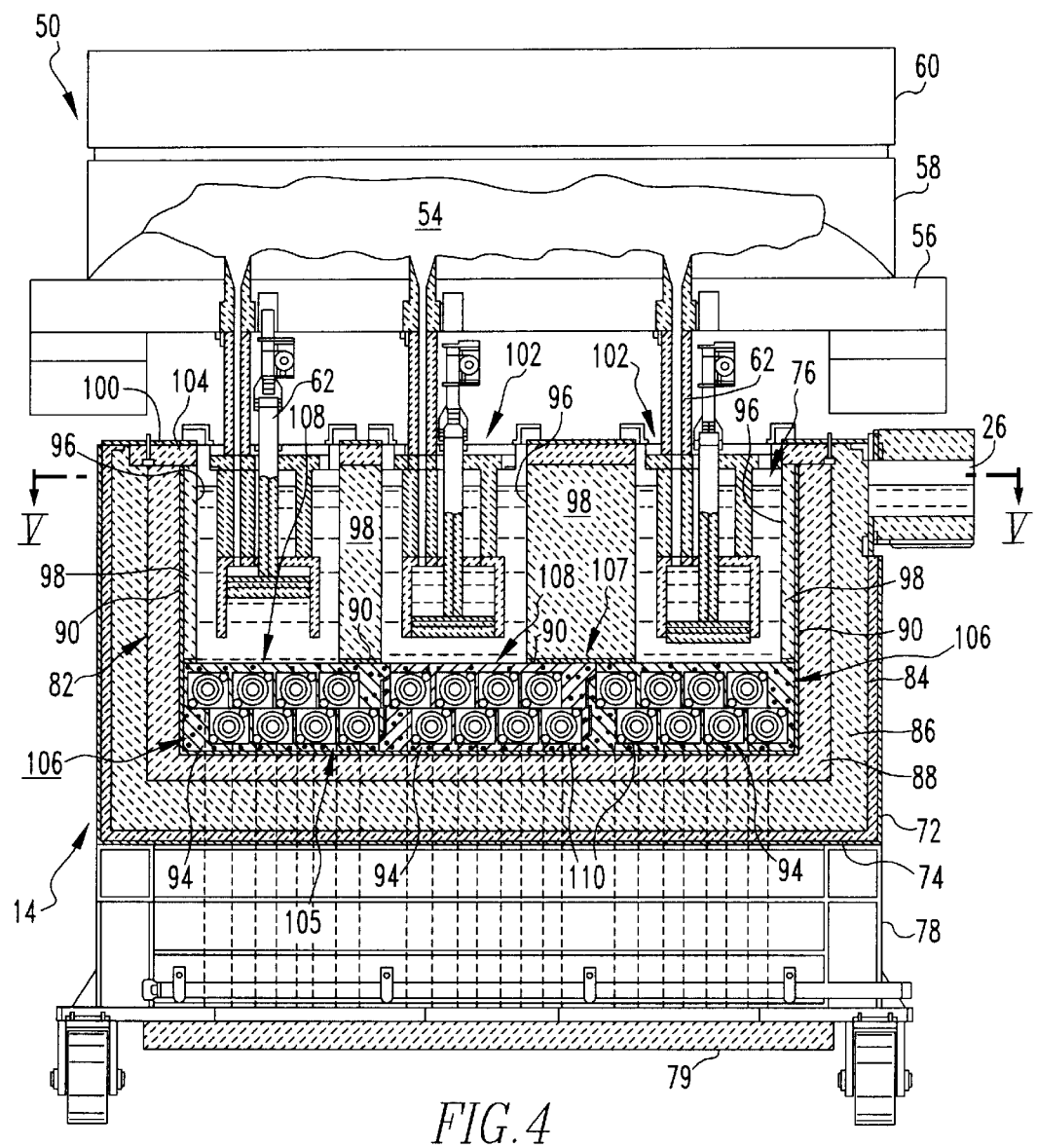
FIG. 4 is a cross-sectional view of the holder furnace viewed from an opposite side of the holder furnace from the cross-sectional view shown in FIG. 3, and further showing vertically extending injector receiving chambers formed within the holder furnace.
Figure 5:
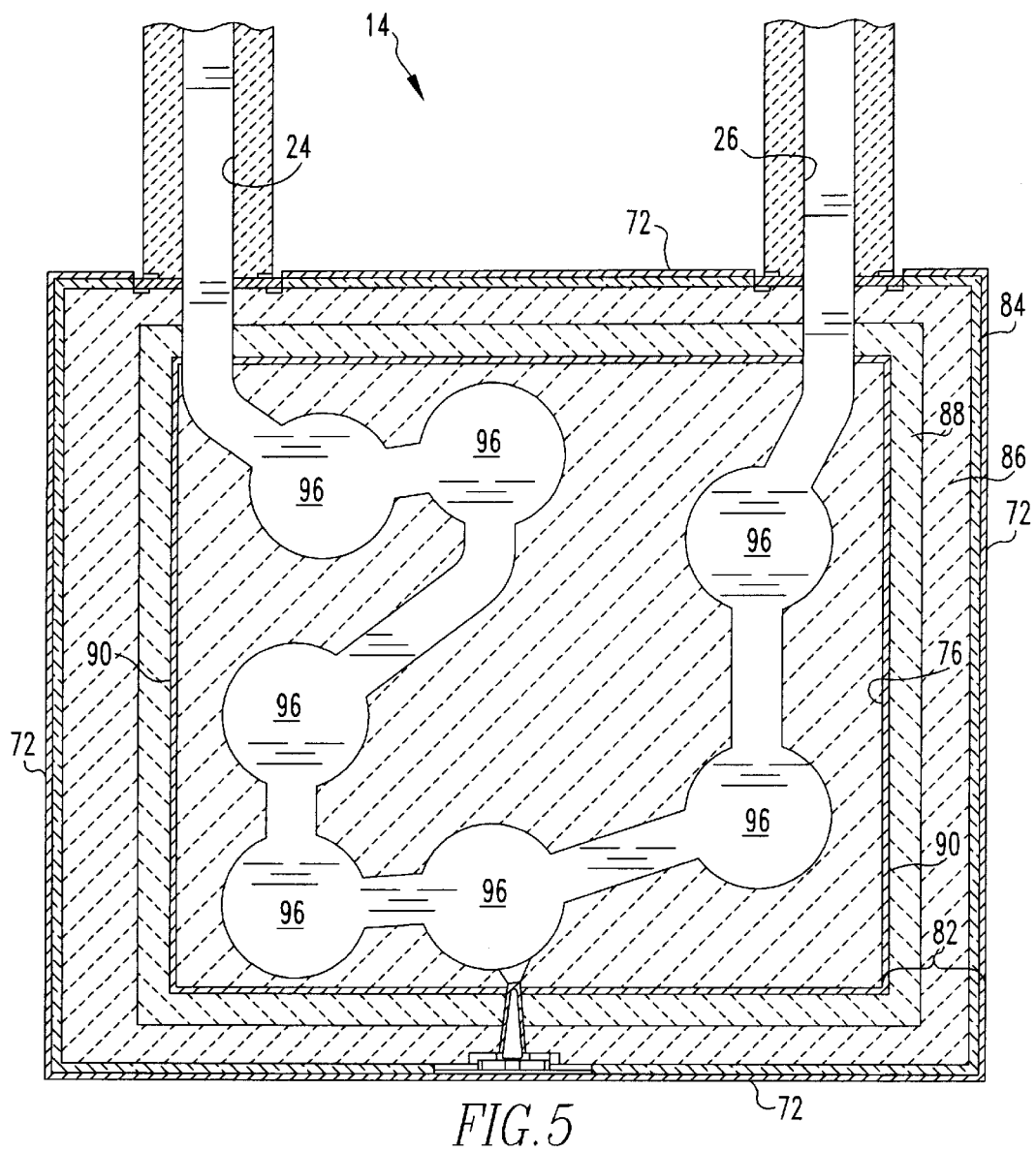
FIG. 5 is a cross-sectional plan view of the holder furnace of FIG. 4 taken along lines V—V in FIG. 4.

FIGS. 3–5 generally show the details of the holder furnace 14. The holder furnace 14 may be used in connection with a casting machine 50 used to cast metal components. The holder furnace 14 is also suitable for use with molten metal filtration units and degassing furnaces. The casting machine 50 includes a casting mold 52 that defines a mold cavity 54 for casting metal components, such as an automobile part. Preferably, the casting mold 52 and mold cavity 54 are configured to cast ultra-large, thin-walled components that may be used in a ground transportation vehicle such as an automobile. An ultra-large, thin-walled component part for a ground transportation vehicle may have dimensions approaching 3 meters long, 1.7 meters wide, and 0.4 meters in depth.

The casting mold 52 is preferably suitable for use with molten metal having a low melting point, such as molten aluminum alloys. The casting mold 52 includes a holder frame 56 for supporting the casting mold 52. The casting mold 52 is generally defined by a lower die 58 and an upper die 60, which together define the mold cavity 54. The casting mold 52 through the holder frame 56 is supported by a support surface (not shown), or by other means customary in the art. The casting mold 52 is preferably located about one to two feet above the holder furnace 14. The casting mold 52 may be supported by a specially designed lower platen that extends downward from the holder frame 56. The lower platen (not shown) is a box-like structure that extends downward from the holder frame 56 and encloses the upper portion of the holder furnace 14. The lower platen may extend downward about four to six feet. The lower platen preferably defines apertures through which the first and second conduits 24, 26 extend to place the holder furnace 14 in fluid communication with the melter furnace 12.

A plurality of molten metal injectors 62 is supported from the bottom side of the casting mold 52. The injectors 62 generally provide fluid communication between the mold cavity 54 and the holder furnace 14. The injectors 62 are preferably configured to provide low pressure, hot chamber injection in which molten metal received in the holder furnace 14 is injected into the mold cavity 54 under low pressure and against the force of gravity. Low pressure, hot chamber injection is particularly well suited for producing components made from non-ferrous material having a low melting point such as aluminum, brass, bronze, magnesium, and zinc. The holder furnace 14 and casting machine 50 are preferably used for casting metal components made of aluminum alloys, but are not necessarily limited to casting of metal components made from aluminum alloys. The injectors 62 are omitted from FIG. 5 for clarity in viewing the top plan view in this figure.

The holder furnace 14 is generally defined by a storage vessel 70 having sidewalls 72 and a bottom wall 74, which define a molten metal receiving chamber 76 configured to contain a supply of molten metal received from the melter furnace 12. The storage vessel 70 is preferably made of metal and, in particular, steel. The storage vessel 70 includes a lower support structure 78, which may include wheels for transporting the holder furnace 14. A lift device 79 may be located beneath the support structure 78 for lifting the holder furnace 14 into engagement with the injectors 62. The lift device 79 may be a jack screw lifting device, a hydraulic lifting mechanism, and the like.

The holder furnace 14 further includes a plurality of furnace lining layers 82 lining the molten metal receiving chamber 76 of the storage vessel 70. In a preferred embodiment of the holder furnace 12, three furnace lining layers 82 line the molten metal receiving chamber 76. A first layer 84 of the furnace lining layers 82 lies immediately adjacent and in contact with the sidewalls 72 and bottom wall 74 of the storage vessel 70. The first layer 84 is preferably a thermal insulation layer having a thickness of about one inch. A suitable thermal insulating material for the first layer 84 is a microporous, pressed silica powder (50–90%) material that is encapsulated in woven cloth such as fiberglass. A suitable material for the first layer 84 includes Microtherm manufactured by Microtherm Inc., Maryville, Tenn.

A second layer 86 is positioned radially inward from the first layer 84 and is in contact therewith. The second layer 86 is preferably an aluminum-resistant, insulating, and castable material. The second layer 86 may be comprised of silica and alumina, and is preferably light in weight and possesses low thermal conductivity properties. A suitable aluminum-resistant, lightweight, insulating, and castable material for the second layer 86 may include approximately 35% silica and 45% alumina by weight. A suitable aluminum-resistant, lightweight, insulating, and castable material for the second layer 86 includes ALSTOP™ Lightweight Castable manufactured by A.P. Green, Minerva, Ohio.

A third layer 88 of the furnace lining layers 82 lies radially inward from the second layer 86 and is in contact therewith. The third layer 88 is preferably a high alumina content castable layer, such as Grefcon™ 80 A manufactured by RHI Refractories America. The third layer 88 may include about 80% alumina by weight. The furnace lining layers 82 generally separate the sidewalls 72 and bottom wall 74 of the storage vessel 70 from the molten metal contained in the molten metal receiving chamber 76. The third layer 88 is also preferably an aluminum-resistant, somewhat insulating, and castable material.

The surface of the molten metal receiving chamber 76 is formed by a sealing layer 90. The sealing layer 90 is preferably an alumina fiber mat material that lines the molten metal receiving chamber 76. A suitable material for the sealing layer 90 is sold under the trademark SAFIL™ Alumina LD Mat, manufactured by Thermal Ceramics, Augusta, Ga. The sealing layer 90 may, for example, include 90–96% alumina fibers by weight.

The first conduit 24 enables molten metal to flow from the melter furnace 12 to the holder furnace 14 and, more particularly, into the molten metal receiving chamber 76. The second conduit 26 returns the molten metal from the molten metal receiving chamber 76 to the heating chamber 16 of the melter furnace 12. The first and second conduits 24, 26 are preferably lined with a refractory material that is suitable for use with molten aluminum alloy, such as Permatech™ Sigma or Beta II castable refractory materials manufactured by Permatech Inc., Graham, N.C. or a substantially equivalent material.

A plurality of heat exchanger blocks 94 is located at the bottom of the molten metal receiving chamber 76 defined by the storage vessel 70. The heat exchanger blocks 94 are used to heat the molten metal received into the molten metal receiving chamber 76. A plurality of vertically extending injector receiving chambers 96 is optionally formed within the molten metal receiving chamber 76 on top of the heat exchanger blocks 94, as shown in FIGS. 4 and 5. The injector receiving chambers 96 are omitted from FIG. 3. The injector receiving chambers 96 are formed by a layer of refractory material 98 located on top of the heat exchanger blocks 94. The refractory material 98 is preferably suitable for use with molten aluminum alloy, such as Permatech™ Sigma or Beta II castable refractory materials discussed previously, or another substantially equivalent material. The injector receiving chambers 96 are sized to accommodate the injectors 62 supported from the bottom side of the casting mold 52. In particular, when the holder furnace 14 is lifted into engagement with the injectors 62 by the lift device 79, the injectors 62 are received, respectively, into the injector receiving chambers 96. The injector receiving chambers 96 may be connected in series from the first conduit 24 to the second conduit 26, as shown in FIG. 5. Thus, molten metal from the melter furnace 12 may flow through the first conduit 24, sequentially into each of the injector receiving chambers 96, and then return to the melter furnace 12 through the second conduit 26.

A furnace cover 100 is positioned on top of the storage vessel 70 to substantially enclose the molten metal receiving chamber 76. The furnace cover 100 includes a plurality of openings 102 corresponding to the plurality of injector receiving chambers 96 for receiving, respectively, the injectors 62 into the injector receiving chambers 96. The furnace cover 100 may be made of metal, such as steel, and preferably includes an insulating layer 104 facing the molten metal receiving chamber 76 to protect the furnace cover 100 from contact with the molten metal contained in the molten metal receiving chamber 76. The insulating layer 104 is preferably an insulating blanket material. The insulating blanket protects the furnace cover 100 from warping because of the high heat of the molten metal in the molten metal receiving chamber 76. Suitable materials for the insulating layer 104 include any of the materials discussed previously in connection with the furnace lining layer 82, such as Microtherm, ALSTOP™ Lightweight Castable, and Grefcon™ 80A, or another substantially equivalent material. Another suitable material for the insulating layer 104 includes Meftec™ manufactured by Thermal Ceramics Inc., Augusta, Ga. This material is a heat storage multi-fiber blanket material that is heat resistant to about 2900° F.

As stated previously, the holder furnace 14 includes one or more heat exchanger blocks 94 located at the bottom of the molten metal receiving chamber 76. The heat exchanger blocks 94 are used to heat the molten metal received into the molten metal receiving chamber 76 from the melter furnace 12. Thus, the holder furnace 14 is generally heated from the bottom. The heat exchanger blocks 94 are thermally conductive, and are preferably made of graphite, silicon carbide, or another material having similar thermally conductive properties. The heat exchanger blocks 94 may be connected together along longitudinal side or end edges by a tongue-in-groove connection, as shown in FIGS. 3 and 4. A preferred taper angle of the tongue-in-groove connection is about 5°. The heat exchanger blocks 94 may be provided as a single, large heat exchanger block having dimensions conforming to the size of the molten metal receiving chamber 76, or multiple blocks as illustrated in FIGS. 3 and 4. The discussion hereinafter refers to a single heat exchanger block 94 for clarity.

In addition to forming the surface of the molten metal receiving chamber 76, the sealing layer 90, discussed previously, also partially covers or encloses the heat exchanger block 94. In particular, the sealing layer 90 covers the heat exchanger block 94 along a bottom face 105 and side faces 106 of the heat exchanger block 94, and may cover portions of a top face 107 of the heat exchanger block 94 when the injector receiving chambers 96 are present. In particular, when the injector receiving chambers 96 are present, the sealing layer 90 is preferably located only on portions of the top face 107. The remaining exposed portions of the top face 107 of the heat exchanger block 94 define heat transfer surfaces 108 of the heat exchanger block 94, as shown in FIG. 4. The heat transfer surfaces 108 are exposed areas of the heat exchanger block 94 intended for direct contact with molten metal contained within the injector receiving chamber 96. The heat transfer surfaces 108 transfer heat from the heat exchanger block 94 to the molten metal contained in the respective injector receiving chamber 96. Thus, the heat transfer surfaces 108 substantially coincide with the injector receiving chambers 96, and the flow paths connecting these chambers, so that the heat exchanger block 94 may be in direct heat transfer contact with the molten metal received in these chambers.

The sealing layer 90 may be omitted entirely from the top face 107 of the heat transfer block 94 if the injector receiving chambers 96 are not formed in the molten metal receiving chamber 76, as shown in FIG. 3. In this situation, the entire top face 107 of the heat exchanger block 94 is exposed and used to transfer heat to the molten metal received within the molten metal receiving chamber 76. In summary, the sealing layer 90 generally separates the bottom face 105 and side faces 106 of the heat exchanger block 94 from contact with the furnace lining layers 82. Further, the sealing layer 90 may be used to separate portions of the top face 107 of the heat exchanger block 94 from contact with the layer of refractory material 98 forming the injector receiving chambers 96 when these chambers are present in the molten metal receiving chamber 76.

The heat exchanger block 94 further includes a plurality of electrical heating elements 110, which are used to heat the heat exchanger block 94 and, further, the molten metal received in the molten metal receiving chamber 76. The embodiment of the holder furnace 14 shown in FIGS. 3 and 4 includes a total of twenty-four electrical heating elements 110. Thus, the three heat exchanger blocks 94 shown in FIGS. 3 and 4 each include eight electrical heating elements 110. However, it will be appreciated by those skilled in the art that the respective heat exchanger blocks 94 may include any number of electrical heating elements 110. The electrical heating elements 110 may be, for example, resistive type electrical heating elements that extend completely or partially through the respective heat exchanger blocks 94.

Figure 6:
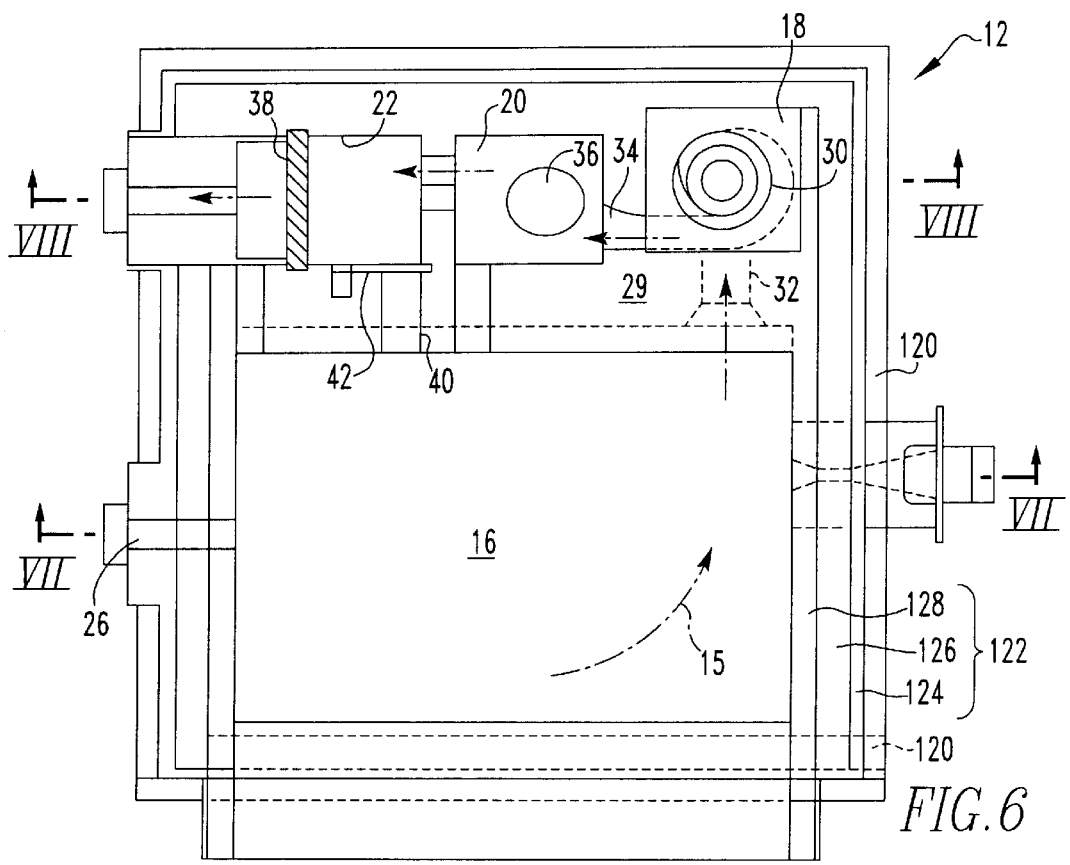
FIG. 6 is a top plan view of a melter furnace used in the molten metal supply system of FIGS. 1 and 2.

Referring now to FIGS. 6–10, the melter furnace 12 in accordance with the present invention will now be discussed in further detail. Referring first to FIG. 6, the melter furnace 12 is generally defined by an outer shell 120 that includes sidewalls and a bottom wall. The outer shell 120 may be made of metal and, preferably, steel. The melter furnace preferably further includes a plurality of furnace lining layers 122 in a similar manner to the holder furnace 14 discussed previously. Thus, the melter furnace 12 includes a first layer 124 immediately adjacent and in contact with the outer shell 120. The first layer 124 is preferably a thermal insulating layer, such as Microtherm discussed previously, or Fiberex™, which contains about 40% silica, 31% calcium, and 13% alumina by weight. Fiberex™ is manufactured by Fiberex Inc., Aurora, Ill. The first layer 124 may have a thickness of about one to three inches and may be similar to the first layer 84 of the holder furnace 14. Fiberex™ may also be used for the first layer 84 of the holder furnace 14.

A second layer 126 is located radially inward and in contact with the first layer 124. The second layer 126 is preferably an insulating, lightweight, and castable material, which exhibits resistance to aluminum penetration. The second layer 126 may be an aluminum-resistant, insulating, lightweight, and castable material made of silica and alumina. A suitable aluminum-resistant, insulating, lightweight, and castable material for the second layer 126 may, for example, be comprised of approximately 35% silica and 45% alumina by weight, such as ALSTOP™ Lightweight Castable discussed previously. The second layer 126 is substantially similar to the second layer 86 used in the holder furnace 14.

A third layer 128 is located radially inward from the second layer 126 and is in contact therewith. The third layer 128 is preferably a high alumina content castable layer that is aluminum resistant. The third layer 128 may include, for example, 80% alumina by weight, such as Grefcon™ 80A discussed previously. The third layer 128 is substantially similar to the third layer 88 used in the holder furnace 14. As shown in FIG. 6, the third layer 128 generally defines the common wall 29 separating the heating chamber 16 from the pump chamber 18, degassing chamber 20, and filtering chamber 22. In addition, the third layer 128 forms the respective walls between the pump chamber 18 and the degassing chamber 20, and between the degassing chamber 20 and the filter chamber 22.

Figure 7:
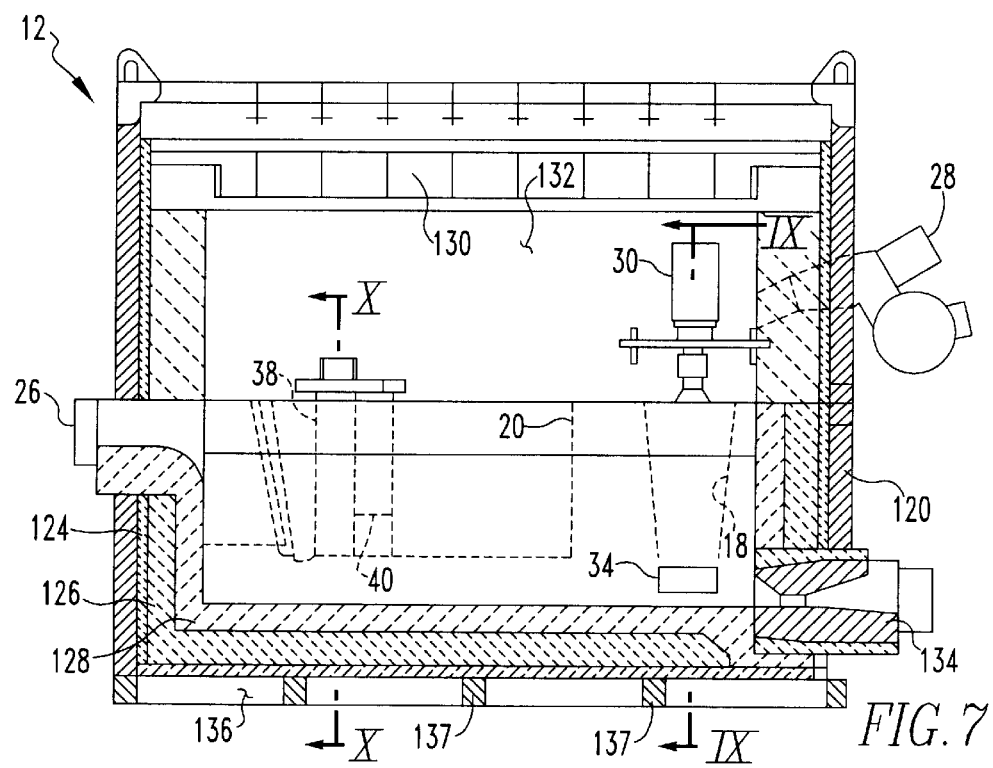
FIG. 7 is a cross-sectional view taken along lines VII—VII in FIG. 6.

Referring now to FIG. 7, a vertical cross section of the melter furnace 12 is shown. The melter furnace 12 includes a roof 130 that defines an open space 132 above the various chambers of the melter furnace 12. The roof 130 of the melter furnace 12 may be a refractory roof or, preferably, may be made of a modular insulating blanket material similar to the insulating layer 104 attached to the bottom side of the furnace cover 100 in the holder furnace 14. The burner 28 may extend into the open space 132 to heat the molten metal received in the heating chamber 16 (not shown). The melter furnace 12 may further include a drain 134 for draining molten metal from the heating chamber 16. The drain hole 134 is used for molten metal alloy changes. In operation, the melter furnace 12 rests on a platform (not shown) that is raised approximately six feet above ground level. The melter furnace 14 when filled with molten metal is extremely heavy, and the platform must be designed to withstand greater than 100,000 pounds of weight. The bottom of the melter furnace 12 may include openings 136 and support beams 137.

Figure 8:
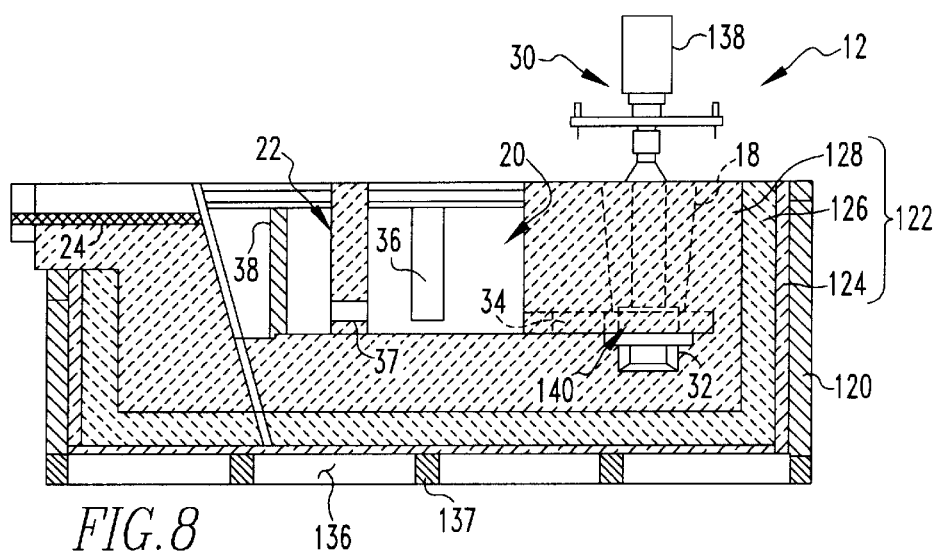
FIG. 8 is a cross-sectional view taken along lines VIII—VIII in FIG. 6.

Referring to FIG. 8, the pump chamber 18, the degassing chamber 20, and the filter chamber 22 are shown. The pump 30 includes a pump motor 138 located above the pump chamber 18, and a pump impeller 140 that extends downward into the pump chamber 18 for pumping the molten metal from the heating chamber 16 to the degassing chamber 20 and, further, for circulating molten metal through the molten metal supply system 10 of the present invention. The pump outlet 34 is connected to the degassing chamber 20. The degassing chamber 20 is connected to the filter chamber 22 through the opening 37 in the wall separating these chambers.

Figure 9:
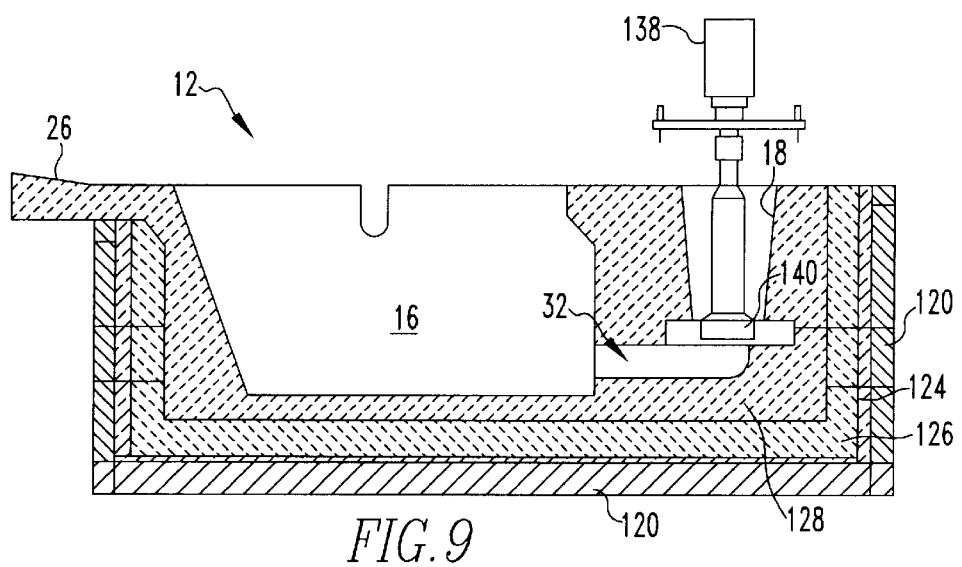
FIG. 9 is a cross-sectional view taken along lines IX—IX in FIG. 7.
Figure 10:
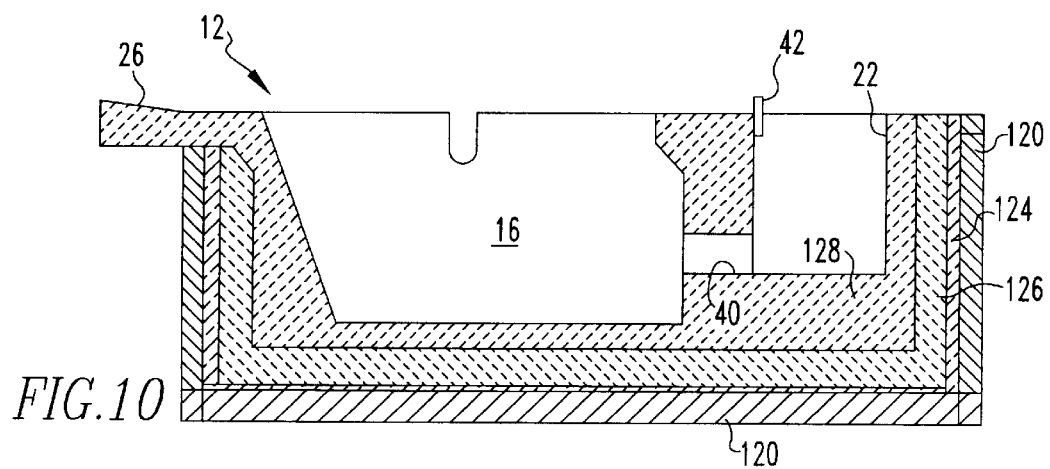
FIG. 10 is a schematic cross-sectional view taken along lines X—X in FIG. 7.

FIG. 9 shows the pump inlet 32 in fluid communication with the heating chamber 16. Finally, FIG. 10 shows the bypass conduit 40 connecting the filter chamber 22 to the heating chamber 16. As discussed previously, the bypass conduit 40 is used to provide for uniform temperature of the molten metal within the melter furnace 12. The bypass conduit 40 may be open during periods when molten metal is not flowing to the holder furnace 12. Additionally, the bypass conduit 40 may be open for recirculation of molten metal to the heating chamber 16 whether or not the pump 30 is circulating molten metal to the holder furnace 14. The bypass gate 42 is used to open or close the bypass conduit 40. As stated previously, the bypass gate 42 may be manually or remotely operated.

With reference to all the figures, operation of the molten metal supply system 10 in accordance with the present invention will now be described. The molten metal supply system 10 will be described hereinafter with the molten metal being molten aluminum alloy as an example. The burner 28 is generally used to maintain the molten aluminum alloy in the heating chamber 16 at approximately 1400° F. Scrap and aluminum pig may also be charged into the heating chamber 16 of the melter furnace 12. This can be done as long as the material being charged does not significantly lower the overall temperature of the molten metal supply system 10. The pump 30 located in the pump chamber 18 is utilized to circulate the molten aluminum alloy through the various chambers of the melter furnace 12 and through the holder furnace 14. The pump 30 receives molten aluminum alloy through the pump inlet 32, and passes the molten aluminum alloy to the degassing chamber 20 through the pump outlet 34. The molten aluminum alloy received in the degassing chamber 20 is degassed by the rotary degassing mechanism 36, which introduces argon or nitrogen into the molten aluminum alloy to degas the molten aluminum alloy. If it is necessary or desirable to remove impurities from the molten aluminum alloy, a mixture of about 0.1–10% chlorine with a balance of argon or, in some cases, nitrogen may be introduced in the molten aluminum alloy by the degassing mechanism 36. Under the action of the pump 30, the molten aluminum alloy is passed from the degassing chamber 20 to the filter chamber 22. The molten aluminum alloy is filtered by the molten metal filter 38 located within the filter chamber 22. From the filter chamber 22, the molten aluminum alloy overflows into the first conduit 24, which is preferably heated to maintain the molten aluminum alloy at approximately 1400° F. At this point, the molten aluminum alloy leaves the melter furnace 12.

Referring to FIGS. 3–5, the now degassed and filtered molten aluminum alloy enters the holder furnace 14 through the first conduit 24. In the holder furnace 14, the molten aluminum alloy preferably enters each of the injector receiving chambers 96 in series. The individual injector receiving chambers 96 are substantially filled to a predefined operating level. The molten aluminum alloy received in the injector receiving chambers 96 is substantially maintained at the system operating temperature of about 1400° F. by the heat exchanger block 94 located at the bottom of the molten metal receiving chamber 76 of the holder furnace 14. However, because the molten aluminum alloy is delivered to the holder furnace 14 at about 1400° F., electrical input to the electrical heating elements 110 is minimized. The molten aluminum alloy in the injector receiving chambers 96 is heated by contact with the heat transfer surfaces 108 defined along the top face 107 of the heat exchanger block 94.

FIG. 5 shows seven injector receiving chambers 96 for casting, for example, a liftgate of a minivan. The arrangement of the injector receiving chambers 96 in FIG. 5 is specific to the liftgate of a minivan. As will be appreciated by those skilled in the art, the injector receiving chambers 96 may be formed in any manner in the molten metal receiving chamber 76 of the holder furnace 14 to form metal components other than the liftgate of a minivan, or omitted altogether. The liftgate of a minivan is cited simply as an example.

The holder furnace 14 is positioned beneath the casting machine 50 and the injectors 62 received within the injector receiving chambers 96 prior to circulating molten metal from the melter furnace 12 to the holder furnace 14. The lifting device 79 is used to lift the holder furnace 14 into engagement with the injectors 62. A programmable logic controller (not shown) preferably individually controls the injectors 62 such that the injectors 62 may be sequenced at different times and at different rates to fill the mold cavity 54 of the casting mold 52 with molten aluminum alloy, and to prevent the formation of air pockets within the mold cavity 54 and, ultimately, the cast component. For example, it may be advantageous to sequence the injection of molten aluminum alloy into the mold cavity 54 so that areas of the mold cavity 54 having greater volume are filled at a faster rate than those areas of the mold cavity 54 that are of smaller volume. The injectors 62 may be sequenced accordingly. The injectors 62, as evidenced by the arrangement shown in FIGS. 3 and 4, generally operate against the force of gravity, and are preferably selected for use with containment difficult metals such as aluminum alloys After an injection cycle, any "retained" molten aluminum alloy within the injector receiving chambers 96 continues to circulate through the holder furnace 14 until the molten metal reaches the second conduit 26. The molten aluminum alloy circulating through the holder furnace 14 exits the holder furnace 14 through the second conduit 26. The second conduit 26 returns the "unused" molten aluminum alloy to the heating chamber 16 of the melter furnace 12.

The above-described circulation cycle within the melter furnace 12, and between the melter furnace 12 and the holder furnace 14, is continuous with molten metal continuously flowing between the melter furnace 12 and the holder furnace 14. As stated previously, the injector receiving chambers 96 are optional, and the injectors 62 may operate in a large "bath" of molten aluminum alloy received within the molten metal receiving chamber 76.

In view of the forgoing, the recirculating molten metal supply system of the present invention may be used to continuously supply molten metal to a holder furnace such that the level of molten metal in the holder furnace remains substantially constant. The recirculating molten metal supply system of the present invention advantageously maintains the temperature of the molten metal within the holder furnace at a substantially constant temperature by continuously circulating molten metal through the holder furnace and minimizing the electrical input requirements of the electrical heating elements of the holder furnace. When the holder furnace is used with a casting machine, the recirculating molten metal supply system of the present invention ensures that the molten metal injectors operate in a "clean" supply of molten metal that is maintained at a substantially constant temperature. Thus, the molten metal supply system of the present invention ensures that clean molten aluminum alloy of substantially uniform temperature is injected into the mold cavity of the casting mold by the injectors. The number of injectors and the configuration of the injector receiving chambers may be changed to suit the specific design criteria, and a potentially infinite number of metal parts components of substantially enhanced quality could be made using the molten metal supply system of the present invention.

While preferred embodiments of the present invention were described herein, various modifications and alterations of the present invention may be made without departing from the spirit and scope of the present invention. The scope of the present invention is defined in the appended claims and equivalents thereto.

We claim:

1. A molten metal supply system for supplying molten metal to a casting machine, comprising:
   a holder furnace defining a molten metal receiving chamber;
   a casting mold located above the holder furnace and defining a mold cavity for casting metal components;
   at least one molten metal injector supported from a bottom side of the casting mold and extending downward into the molten metal receiving chamber, with the injector providing fluid communication between the molten metal receiving chamber and the mold cavity, and with the injector configured to inject molten metal received into the molten metal receiving chamber into the mold cavity, and
   a melter furnace located externally adjacent the holder furnace and in fluid communication with the bolder furnace through a first conduit for supplying molten metal to the molten metal receiving chamber, and through a second conduit for recirculating molten metal from the molten metal receiving chamber to to melter furnace, with the melter furnace further comprising:
      a heating chamber in fluid communication with the molten metal receiving chamber through the second conduit for receiving molten metal recirculating back trough the second conduit from the holder furnace;
      a pump chamber located adjacent the heating chamber and housing a molten metal pump, with the pump having an inlet in fluid communication with the heating chamber and having an outlet, and with the pump configured to circulate molten metal through the molten metal supply system during operation;
      a degassing chamber located adjacent the pump chamber and housing a degassing mechanism, with the outlet of the pump in fluid communication with the degassing chamber and providing molten metal to the degassing chamber during operation of the molten metal supply system; and
      a filter chamber located adjacent and in fluid communication with the degassing chamber, with the filter chamber in fluid communication with the molten metal receiving chamber through the first conduit for supplying degassed and filtered molten metal to the molten metal receiving chamber during operation of the molten metal supply system,
      wherein a common wall separates the heating chamber from the pump, degassing, and filter chambers.

2. The molten metal supply system of claim 1, wherein the molten metal receiving chamber defines a plurality of vertically extending chambers connected in series.

3. The molten metal supply system of claim 2, further including a plurality of molten metal injectors supported from the bottom side of the casting mold, and wherein the injectors cooperate, respectively, with the plurality of vertically extending chambers.

4. The molten metal supply system of claim 1, wherein the heating chamber includes a burner for heating the molten metal contained therein during operation of the molten metal supply system.

5. The molten metal supply system of claim 1, wherein the degassing mechanism is a rotary degassing mechanism.

6. The molten metal supply system of claim 1, wherein the filter chamber includes a molten metal filter configured to filter particles larger than about 50–80 microns.

7. A melter furnace, comprising:
   a heating chamber configured to contain molten metal and including a heating device for heating the molten metal received in the heating chamber;
   a pump chamber located adjacent the healing chamber and housing a molten metal pump, with the pump having an inlet in fluid communication with the heating chamber and having an outlet;
   a degassing chamber located adjacent the pump chamber and housing a degassing mechanism, with the outlet of the pump in fluid communication with the degassing chamber for providing molten metal to the degassing chamber; and
   a filter chamber located adjacent and in fluid communication with the degassing chamber, with the filter chamber including a molten metal filter for filtering molten metal flowing through the filter chamber,
   wherein the pump is configured to circulate molten metal through the degassing chamber and filter chamber during operation of the pump, and wherein a common wall separates the heating chamber from the pump, degassing, and filter chambers.

8. The molten metal supply system of claim 7, wherein the degassing mechanism is a rotary degassing mechanism.

9. The molten metal supply system of claim 7, wherein the molten metal filter is configured to filter particles larger than about 50–80 microns.

10. The molten metal supply system of claim 7, wherein the heating device is a burner located adjacent the heating chamber.

11. A method of supplying molten metal to a casting machine, comprising:

a casting mold defining a mold cavity for casting metal components, a holder furnace located beneath the casting mold for supplying molten metal to the mold cavity, and a melter furnace externally positioned adjacent the holder furnace for supplying molten metal to the holder furnace, the melter furnace in fluid communication with the holder furnace through a first conduit for supplying molten metal to the holder furnace, and through a second conduit for recirculating molten metal from the holder furnace to the melter furnace, with the melter furnace further comprising:

a heating chamber configured to contain molten metal and including a heating device for heating the molten metal received in the heating chamber;

a pump chamber located adjacent the heating chamber and housing a molten metal pump, with the pump having an inlet in fluid communication with the heating chamber and having an outlet;

a degassing chamber located adjacent the pump chamber and housing a degassing mechanism, with the outlet of the pump in fluid communication with the degassing chamber for providing molten metal to the degassing chamber; and a filter chamber located adjacent and in fluid communication with the degassing chamber, with the filter chamber including a molten metal filter for filtering molten metal flowing through the filter chamber, wherein the pump is configured to circulate molten metal through the degassing chamber and filter chamber during operation, and wherein a common wall separates the heating chamber from the pump, degassing, and filter chambers;

the method comprising steps of:

filling the melter furnace with molten metal;
heating molten metal in the heating chamber;
pumping molten metal from the heating chamber to the degassing chamber and the filter chamber with the pump;
degassing die molten metal in the degassing chamber;
filtering the molten metal in the filter chamber;
supplying degassed and filtered molten metal to the holder furnace through the first conduit; and
continuously recirculating molten metal from the holder furnace to the heating chamber through the second conduit.

12. The method of claim 11, further comprising the step of supporting a plurality of molten metal injectors from a bottom side of the casting mold, with the injectors configured to provide fluid communication between the holder furnace and the casting mold.

13. The method of claim 12, wherein the holder furnace defines a molten metal receiving chamber having a plurality of vertically extending chambers connected in series, and wherein the method further comprises the step of receiving the molten metal injectors into the vertically extending chambers, respectively, with the injectors placing the vertically extending chambers in fluid communication with the mold cavity.

14. The method of claim 13, further comprising the step of passing molten metal to the vertically extending chambers through the first conduit.

15. The method of claim 14, further comprising the step of pumping molten metal through the vertically extending chambers to maintain a substantially constant level of molten metal in the vertically extending chambers.

16. The method of claim 15, further comprising the steps of receiving molten metal into each of the injectors; and injecting molten metal into the mold cavity with the injectors at different times and at different rates to completely fill the mold cavity.

17. The method of claim 11, wherein the degassing mechanism is a rotary degassing mechanism, and the method further comprises the step of supplying a mixture of about 0.1 to 10% chlorine with a balance of one of argon and nitrogen gas to the molten metal in the degassing chamber with the rotary degassing mechanism to degas the molten metal passing through the degassing chamber.

18. The method of claim 11, wherein a molten metal level sensor is located in the filter chamber, and the method further comprises the step of monitoring the level of molten metal in the filter chamber with the level sensor.

19. The method of claim 18, further comprising the step of sending a cutoff signal to the pump when the level of molten metal in the filter chamber reaches a predetermined level.

20. The method of claim 11, further comprising the step of internally circulating molten metal in the melter furnace through a bypass conduit connecting the filter chamber and the heating chamber.

* * * * *

UNITED STATES PATENT AND TRADEMARK OFFICE
CERTIFICATE OF CORRECTION

PATENT NO. : 6,585,797 B2
DATED : July 1, 2003
INVENTOR(S) : Kinosz et al.

It is certified that error appears in the above-identified patent and that said Letters Patent is hereby corrected as shown below:

Column 14,
Line 4, insert -- through -- delete "trough"

Column 15,
Line 47, insert -- the -- delete "die"

Signed and Sealed this

Eighth Day of June, 2004

JON W. DUDAS
*Acting Director of the United States Patent and Trademark Office*